(No Model.) 2 Sheets—Sheet 2.

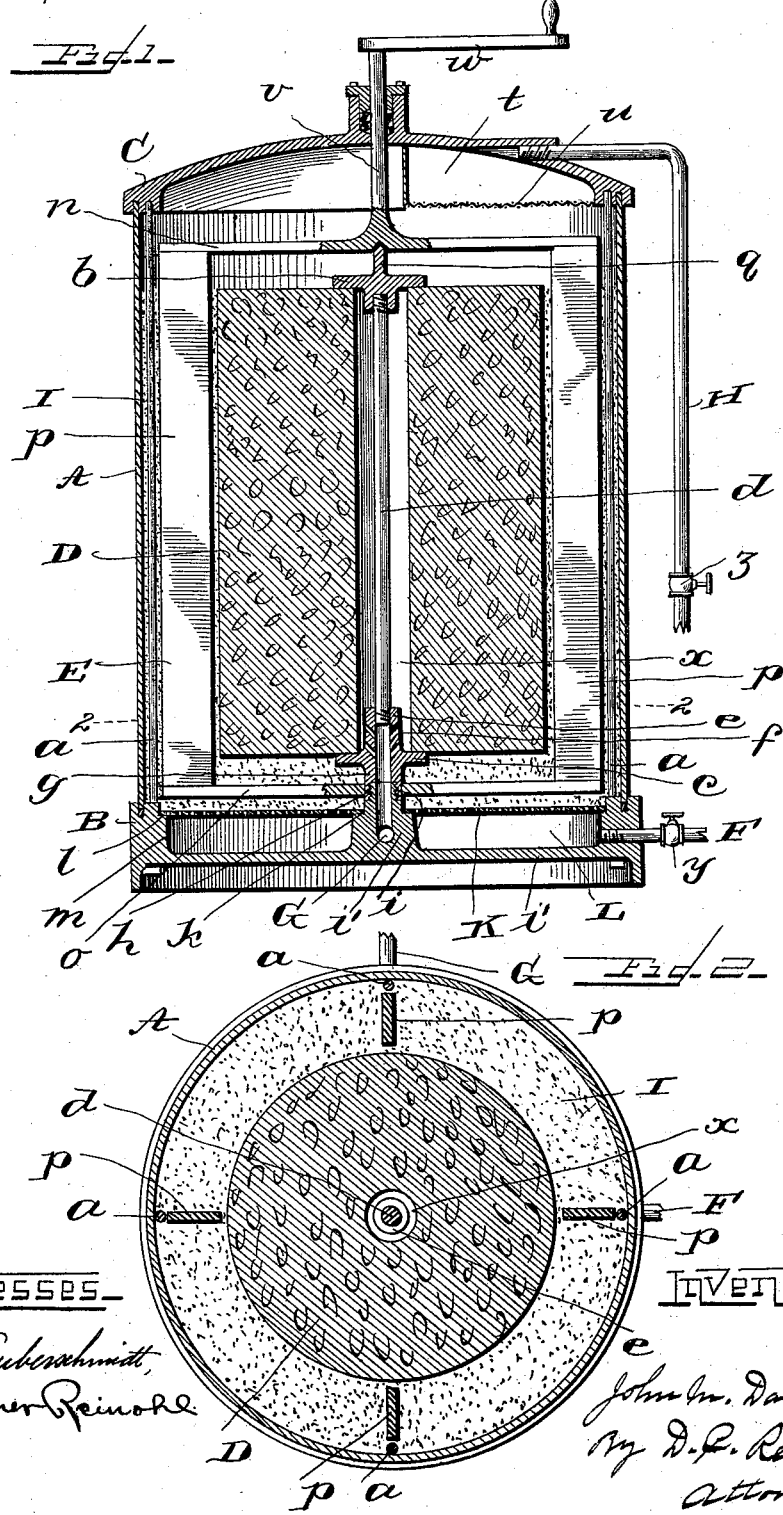

J. M. DAVIDSON.
FILTER.

No. 570,910. Patented Nov. 10, 1896.

Witnesses
G. A. Rauberschmidt
D. Weimer Reinöhl

Inventor
John M. Davidson
By D. G. Reinöhl
Attorney.

UNITED STATES PATENT OFFICE.

JOHN M. DAVIDSON, OF ALLEGHENY, PENNSYLVANIA, ASSIGNOR TO JAMES VERNER SCAIFE, OF SAME PLACE.

FILTER.

SPECIFICATION forming part of Letters Patent No. 570,910, dated November 10, 1896.

Application filed April 2, 1896. Serial No. 585,948. (No model.)

*To all whom it may concern:*

Be it known that I, JOHN M. DAVIDSON, a citizen of the United States, residing at Allegheny, in the county of Allegheny and State of Pennsylvania, have invented certain new and useful Improvements in Filters; and I do hereby declare the following to be a full, clear, and exact description of the invention, such as will enable others skilled in the art to which it appertains to make and use the same.

My present invention relates to filters, and has especial reference to that class of filters which use a tubular porous filtering-body, such as stone or composition, and a body of granular material surrounding the former, and through both of which the water is required to pass in the operation of filtering, the granular material being used also for the purpose of scouring the periphery or outer surface of the tubular filtering-body to remove the accumulated impurities therefrom.

In filtering water through granular beds the material of which the bed is composed, generally fine sand, becomes very thoroughly packed around the filtering-body, and in attempting to revolve said body in the packed filtering material, the former has, owing to its porous structure, been broken in two and thereby destroyed.

A further difficulty has been encountered with this class of filters in which the tubular filtering-body is revoluble, namely, the sand of which the granular bed is composed works into the bearing of said body and its seat in the lower end of the filter and destroys the joint of the bearing.

It is my purpose to obviate these difficulties, and for this purpose I make the tubular filtering-body stationary, and revolve the granular material of which the filter-bed is composed around said body.

The invention will be fully disclosed in the following specification and claims.

Figure 3:
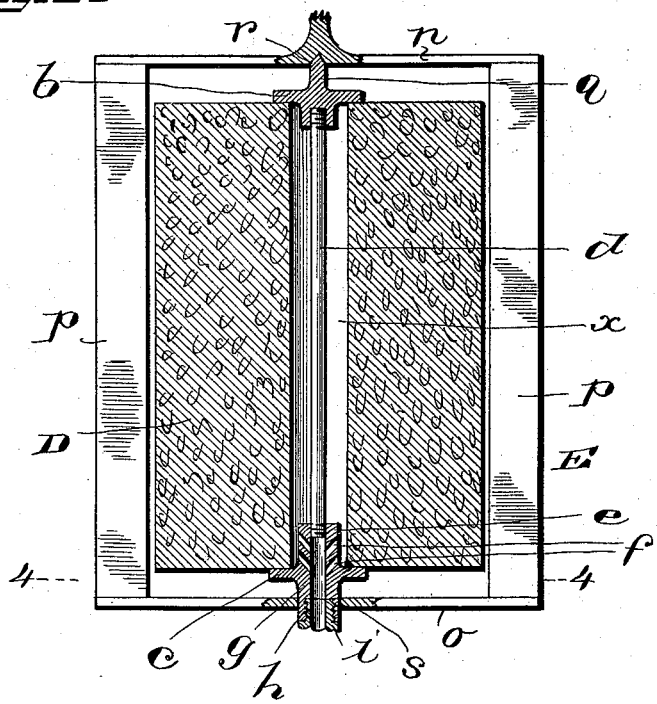
Figure 4:
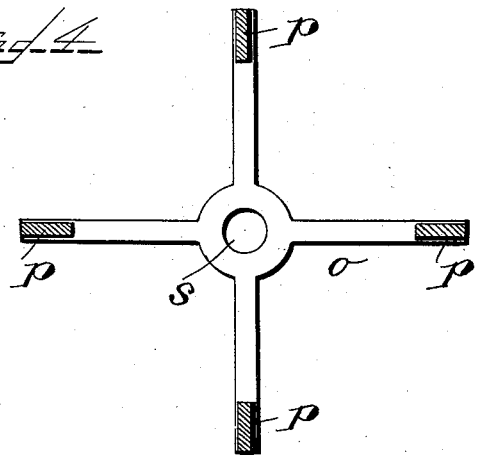

In the accompanying drawings, which form part of this specification, Figure 1 represents a vertical section of my improved filter; Fig. 2, a transverse section on the line 2 2, Fig. 1; Fig. 3, a vertical section of the tubular filtering-body and the cage; and Fig. 4, a top plan view of the spider forming the lower end of the cage, taken on the line 4 4, Fig. 3.

Reference being had to the drawings and the letters thereon, A indicates the body or casing of the filter, usually made of sheet-iron; B, the base, and C the top or cover, both of which are castings and are secured together, with the body A between them, by rods or bolts $a$; D, the tubular filtering-body; E, the cage surrounding said body; F, the inlet-pipe; G, the outlet or discharge for filtered water; H, the waste-water pipe for conducting the dirty water from the filter when the filter is being cleaned, and I the bed of granular filtering material surrounding the tubular filtering-body and filling the annular space or chamber between said body and the wall or body A of the filter.

The body D is clamped between two disks $b$ $c$ by a rod $d$, the lower disk $c$ being provided with an upward tubular extension $e$, having apertures $f$ through it for the discharge of filtered water, and a downward tubular extension $g$, the lower end of which is internally screw-threaded at $h$ and engages a tubular screw-threaded boss $i$, projecting upward from the bottom $i'$ of the base, and secures the body D against rotating in the filter. The boss $i$ is also provided with a concentric shoulder $k$, upon which and the annular shoulder $l$ on the interior of the vertical wall $m$ of the boss rests the perforated bottom K of the chamber containing the filtering medium.

Between the bottom $i'$ and the bottom K is the water-supply chamber L, with which the pipe F communicates, and from which chamber the water passes upward through the filtering media.

Surrounding the tubular body D, and out of contact with its periphery, is a cage E, which consists of an upper and a lower spider $n$ $o$, connected by bars $p$, which may be of any preferred form, and the cage is supported by the tubular body D and revolves freely thereon, the bearings for the cage being formed by a pintle $q$ on the upper side of the disk $b$ and a seat $r$ in the under side of the spider $n$ and by a central aperture $s$ in the lower spider $o$, which surrounds the extension $g$ of the disk $c$.

In the cover C of the filter is a chamber $t$, with which the waste-pipe H communicates, and said chamber is provided with a foraminous or wire-gauze bottom $u$ to arrest the granular material of the filter-bed in cleansing the bed, and said bottom and the bottom K are in such proximity to the spiders $n$ $o$ of the cage E that the sand of the granular filter-bed is dashed against their surfaces with such force while the bed is being revolved and agitated as to remove all impurities therefrom.

From the spider $n$ a shaft $v$ extends through the cover C and is provided with a crank $w$, by means of which the cage E is revolved, which in turn revolves the granular filtering material which cleanses the outer surface of the body D and the inner surface of the body A of the filter by frictional contact therewith, while the filtering material is cleansed by attrition of its particles.

In filtering water the valve $y$ in the supply-pipe F is opened and the valve $z$ in the waste-pipe H closed, and the water flows from the chamber L up through the granular bed I, where the coarser impurities are arrested, and then through the porous body D into its chamber $x$, and from the chamber $x$ through the discharge G, and when cleaning the filter the valve $z$ in the waste-pipe H is opened, and when the pressure of the water has loosened the particles of the filter-bed I the cage E is revolved and the dirty water conducted through pipe H to a sewer or other suitable receptacle.

Having thus fully described my invention, what I claim is—

1. A filter provided with a stationary or fixed casing and tubular filtering-body and a granular bed of filtering material surrounding said body, in combination with a revoluble cage in said granular bed surrounding said tubular body, out of contact with its periphery.

2. A filter provided with a stationary or fixed casing and tubular filtering-body and a granular bed of filtering material surrounding said body, in combination with a revoluble cage in said granular bed supported by and surrounding said tubular body, out of contact with its periphery.

3. A filter provided with a stationary or fixed casing and tubular filtering-body and a granular bed of filtering material surrounding said body, in combination with a cage in said granular bed having connected upper and lower spiders and surrounding said tubular body, out of contact with its periphery.

4. A filter provided with a stationary or fixed casing and tubular filtering-body, a granular bed surrounding said body and a discharge-chamber above the filtering material having a foraminous bottom, in combination with a cage in said granular bed having means for agitating the granular bed and surrounding said tubular body, out of contact with its periphery.

In testimony whereof I affix my signature in presence of two witnesses.

JOHN M. DAVIDSON.

Witnesses:
   D. C. REINOHL,
   D. WEIMER REINOHL.